(12) United States Patent
Edwards

(10) Patent No.: US 6,212,819 B1
(45) Date of Patent: Apr. 10, 2001

(54) REUSABLE, ODORLESS RODENT TRAP

(76) Inventor: Richard H. Edwards, 4132 2nd St., NE., Hickory, NC (US) 28601-9010

( * ) Notice: Subject to any disclaimer, the term of this patent is extended or adjusted under 35 U.S.C. 154(b) by 0 days.

(21) Appl. No.: 09/377,026

(22) Filed: Aug. 18, 1999

(51) Int. Cl.$^7$ ................................................ A01M 23/10
(52) U.S. Cl. ............................................................. 43/71
(58) Field of Search ................................ 43/69, 71, 70, 43/74

(56) References Cited

U.S. PATENT DOCUMENTS

| | | | |
|---|---|---|---|
| 710,020 | * | 9/1902 | Short ........................................ 43/71 |
| 1,050,220 | * | 1/1913 | Link ......................................... 43/71 |
| 1,086,259 | * | 2/1914 | Yost ......................................... 43/71 |
| 1,630,123 | * | 5/1927 | Kesel ....................................... 43/71 |
| 2,565,142 | * | 8/1951 | Mattlingly ................................ 43/71 |
| 2,775,844 | * | 1/1957 | Barnes ..................................... 43/69 |
| 4,241,531 | * | 12/1980 | Nelson et al. ........................... 43/69 |
| 4,662,101 | * | 5/1987 | Fisher ...................................... 43/69 |
| 4,845,887 | * | 7/1989 | Snyder ..................................... 43/71 |
| 5,517,784 | * | 5/1996 | Sedore ..................................... 43/69 |
| 5,528,852 | * | 6/1996 | Sarff ........................................ 43/71 |
| 5,720,126 | * | 2/1998 | Lamb ....................................... 43/72 |
| 5,782,034 | * | 7/1998 | Robin et al. ............................. 43/71 |
| 5,996,274 | * | 12/1999 | Smith et al. ............................. 43/71 |

FOREIGN PATENT DOCUMENTS

25468 * 12/1901 (GB) ......................................... 43/71

OTHER PUBLICATIONS

Robert Laughlin, How to Save Materials, American Builder, p. 182, Jul. 1951.*

* cited by examiner

Primary Examiner—Kurt Rowan
(74) Attorney, Agent, or Firm—Adams, Schwartz & Evans, P

(57) ABSTRACT

An apparatus for trapping and killing rodents, the apparatus including a container having an opening, the container being oriented such that the opening faces upward, thereby enabling retention of rodents in said container. The apparatus also includes a substantially cylindrical member rotatably mounted across the opening of the container, the cylindrical member providing unstable support for rodents, thereby causing rodents positioning themselves on the cylindrical member to fall into said container. A portion of the cylindrical member is treated with at least one rodent attractant to attract rodents to position themselves on the cylindrical member. The container contains a substance for killing rodents and masking the scent caused by the decomposition of rodents.

12 Claims, 3 Drawing Sheets

REUSABLE, ODORLESS RODENT TRAP

TECHNICAL FIELD AND BACKGROUND OF INVENTION

This invention relates to a reusable, odorless rodent trap. Some traditional rodent traps are single-use only; that is, after a single rodent is caught in the trap, in order to avoid an unsanitary and unpleasant cleanup, the entire trap must be discarded with the dead rodent. Some prior art rodent traps, although reusable, may require regular rebaiting. In addition, some prior art rodent traps do not provide any means of masking the scent that is likely to emanate from a decomposing rodent that is not immediately discarded. Finally, some traditional rodent traps rely on toxic chemicals or proprietary, specially-manufactured parts to achieve their goal.

The present invention overcomes the above disadvantages by providing a rodent trap comprised of a container and a substantially cylindrical member rotatably mounted on the container by a mounting means. The container is partially filled with a substance that is capable both of drowning the rodent and masking the scent of the rodent's decomposing carcass. The cylindrical member is treated with materials to stimulate the visual and/or olfactory senses of the rodent, thereby leading the rodent to position itself on the cylindrical member, causing the cylindrical member to rotate. The rotation of the cylindrical member prompts the rodent to fall into the substance in the container. The rodent then drowns in the substance while the substance masks the accompanying odor.

Therefore, the invention is a simple combination of basic elements that improves on the prior art. First, all the elements of the invention are reusable. The attractants on the cylindrical member are not expended with each rodent trapped; neither is the rodent-drowning, odor-masking substance. The substance in the container may be comprised of a mixture of basic, non-toxic household items such as water and molasses, making occasional refilling of the container a safe and inexpensive task. If the container is sizable enough to accommodate more than one dead rodent or if each dead rodent may be removed with minimal unpleasantness to the user, refilling of the container may be fairly infrequent. Finally, the trap hardware itself—the container, the cylindrical member, and the mounting means—is not exhausted with each use; it may easily be repeatedly reused over an appreciable length of time.

Second, the substance in the container—for example, the mixture of water and molasses suggested above—successfully masks any odor caused by the decomposition of the rodent, allowing the user to avoid having to empty the trap soon after a rodent is caught.

In sum, the invention provides a reusable, odorless, safe, and inexpensively renewed rodent trap, thus improving upon the prior art.

SUMMARY OF THE INVENTION

Therefore, it is an object of the invention to provide a reusable, odorless rodent trap.

It is another object of the invention to provide a reusable, odorless rodent trap that includes at least one non-toxic rodent attractant comprising basic, inexpensive household items.

It is another object of the invention to provide a reusable, odorless rodent trap that includes a non-toxic rodent-drowning substance comprising basic, inexpensive household items.

It is another object of the invention to provide a reusable, odorless rodent trap that drowns the rodent in a substance that masks the odor caused by the decompositon of the rodent.

It is another object of the invention to provide a reusable, odorless rodent trap having rodent attractants that endure more than one use.

It is another object of the invention to provide a reusable, odorless rodent trap having a rodent-drowning substance that endures more than one use.

It is another object of the invention to provide a reusable, odorless rodent trap with major structural components that endure more than one use.

These and other objects of the present invention are achieved in the preferred embodiments disclosed below by providing an apparatus for trapping and killing rodents, said apparatus including a container having an opening, the container being oriented such that the opening faces upward, thereby enabling retention of rodents in said container. The apparatus also includes a substantially cylindrical member rotatably mounted across the opening of the container, the cylindrical member providing unstable support for rodents, thereby causing rodents positioning themselves on the cylindrical member to fall into said container. A portion of the cylindrical member is treated with at least one rodent attractant to attract rodents to position themselves on the cylindrical member. The container contains a substance for killing rodents and masking the scent caused by the decomposition of rodents.

According to one preferred embodiment of the invention, the cylindrical member is a plastic bottle.

According to another preferred embodiment of the invention, the cylindrical member has at least two holes for carrying a rigid rod for rotatably mounting the cylindrical member on the container.

According to another preferred embodiment of the invention, the holes vary in size such that the cylindrical member rotates unevenly about the rod, thereby causing rodents positioning themselves on the cylindrical member to fall into the container.

According to yet another preferred embodiment of the invention, the rodent attractant is a visual rodent attractant removably attached to a portion of the cylindrical member.

According to yet another preferred embodiment of the invention, the visual rodent attractant comprises distinctively-colored adhesive tape.

According to yet another preferred embodiment of the invention, the rodent attractant is an olfactory rodent attractant applied to a portion of the cylindrical member.

According to yet another preferred embodiment of the invention, the olfactory rodent attractant comprises molasses.

According to yet another preferred embodiment of the invention, the rodent attractant comprises both a visual rodent attractant and an olfactory rodent attractant.

According to yet another preferred embodiment of the invention, the visual rodent attractant comprises distinctively-colored adhesive tape and the olfactory rodent attractant comprises molasses.

According to yet another preferred embodiment of the invention, the substance in the container comprises water and molasses.

According to yet another preferred embodiment of the invention, the rodent is killed by drowning in the substance in the container.

A preferred embodiment of the invention provides an apparatus for trapping and killing small rodents such as mice and rats. The apparatus includes a container having an opening, the container being oriented such that the opening faces upward, thereby enabling retention of rodents in the container. The apparatus also includes a bottle rotatably mounted across the opening of the container, the bottle having at least two holes for carrying a rigid rod for rotatably mounting the bottle on the container, the holes varying in size such that the bottle rotates unevenly about the rod, thereby causing rodents positioning themselves on the bottle to fall into the container. A portion of the bottle is removably coated with molasses and distinctively-colored adhesive tape is removably attached to a portion of the bottle, both to attract rodents to position themselves on the bottle. The container contains a mixture of water and molasses for drowning rodents and masking the scent caused by the decomposition of rodents.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
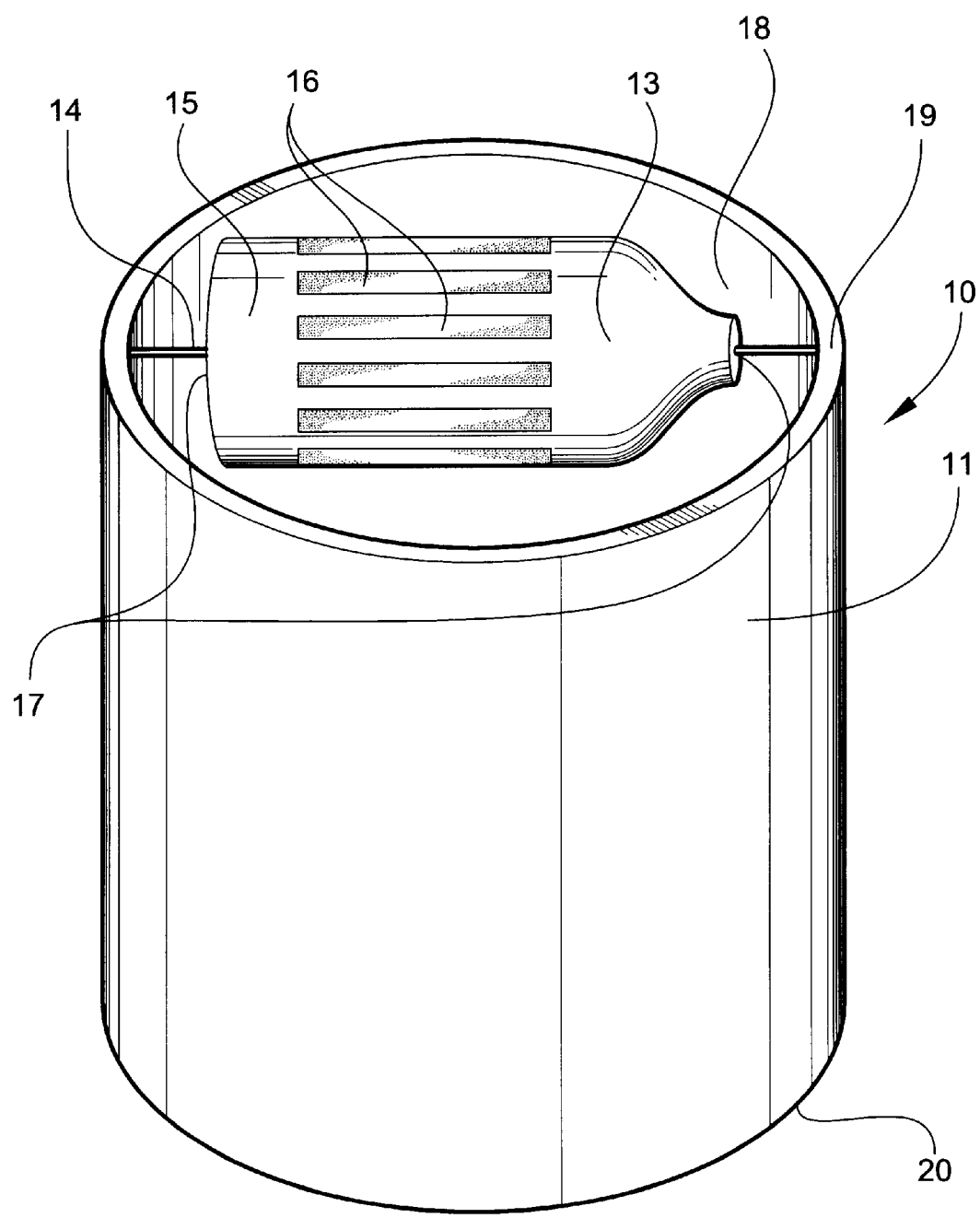
FIG. 1 is a perspective view of the invention with a representation of the contents of the rodent trap.
Figure 3:
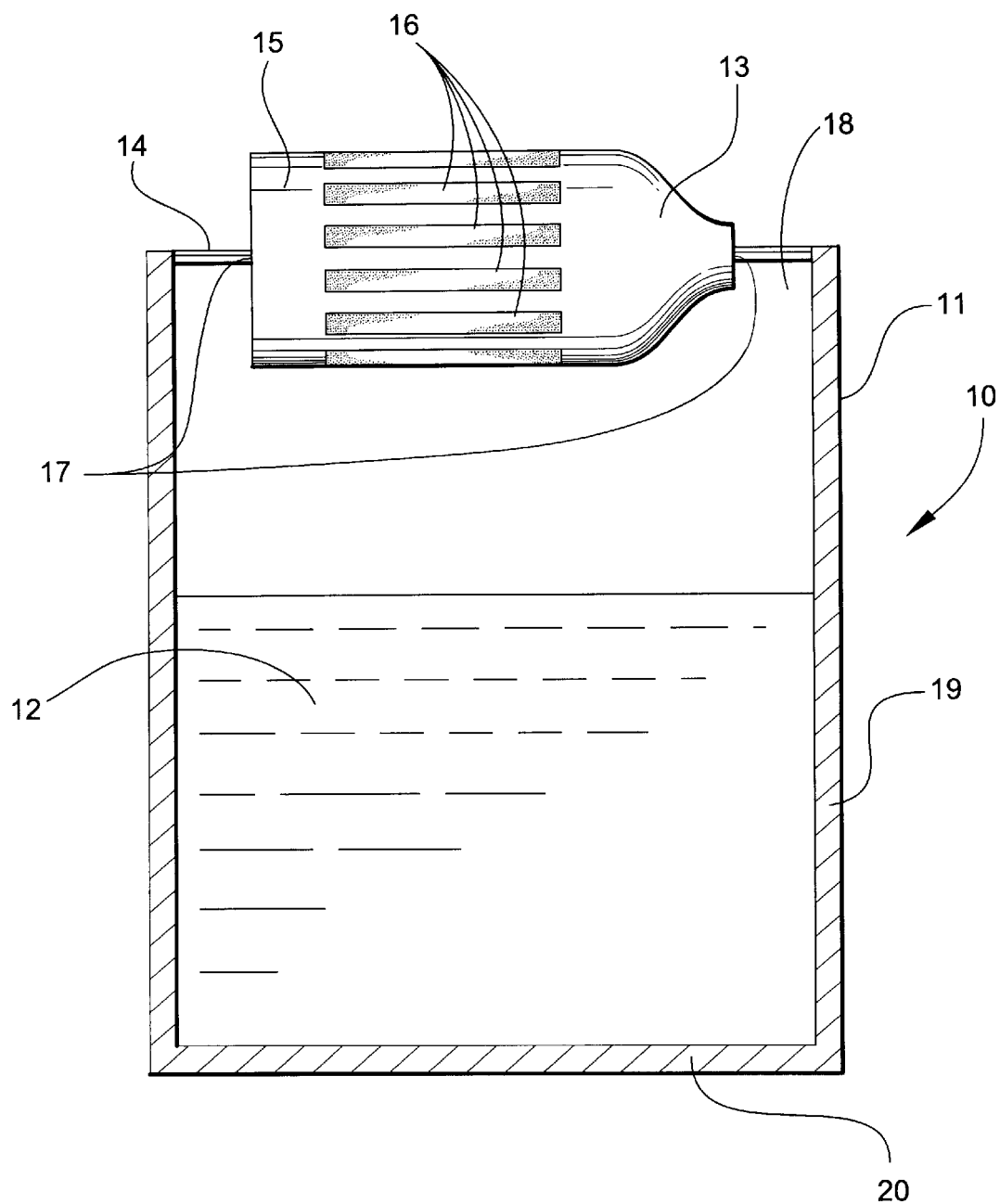
FIG. 3 is a vertical cross-section taken through line 3—3 of FIG. 2 showing the substance in the container and the cylindrical member.

Referring now specifically to the drawings, a reusable, odorless rodent trap according to the present invention is illustrated in FIG. 1 and shown generally at reference numeral 10. The trap includes a container such as a pail or bucket 11 with an upward-facing opening 18 defined by at least one side wall 19, and a bottom 20. In a preferred embodiment, the bucket 11 is substantially cylindrical, having one continuous side wall 19 and a bottom 20. As shown in FIG. 3, the bucket 11 is partially filled with a substance such as water 12, for drowning rodents and masking the scent caused by the decomposition of the drowned rodents. In a preferred embodiment, the water 12 is actually a mixture of water and molasses; however, water 12 may comprise other rodent-killing, scent-masking agents. The amount of water 12 contained in the bucket 11 must, in combination with the remainder of the trap 10, provide enough weight to prevent trapped rodents from overturning the trap 10. The side wall 19 of the bucket 11 must be slippery and/or steep enough to prevent trapped rodents from climbing out.

Figure 2:
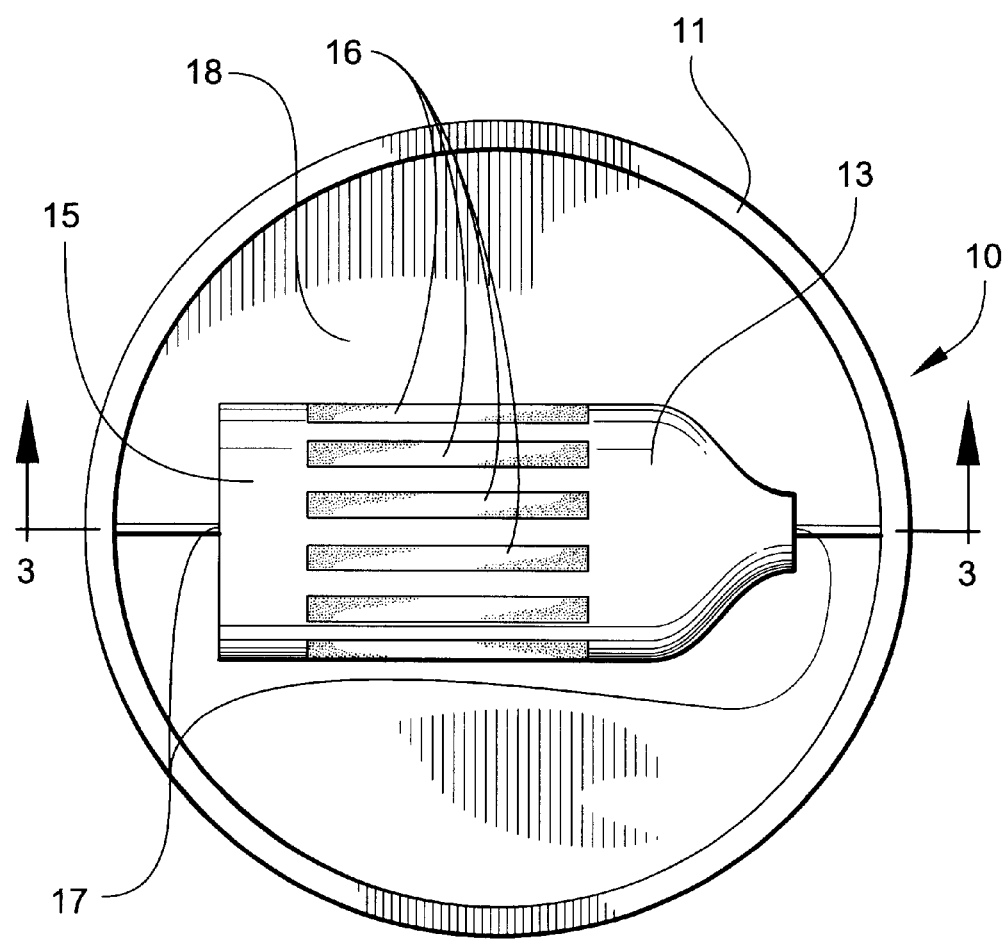
FIG. 2 is a top plan view of the invention.

As is illustrated in FIGS. 1, 2, and 3, a substantially cylindrical member such as a bottle 13 is mounted to extend across the opening 18 of the bucket 11. In a preferred embodiment of the invention, the bottle 13 is plastic bottle such as a polyethylene soda or water bottle small enough to fit within the diameter of the bucket 11. The bottle 13 includes two holes 17 situated at opposite ends of the bottle 13, through which a mounting means such as a metal rod 14 secured to the bucket 11 extends, as shown in FIG. 1. The rod 14 may also be a plastic rod or some other type of rigid mounting structure, or a flexible structure such as rope, string, twine, or cord, as long as the bottle 13 may rotate without contacting the water 12 and without hanging substantially below the opening of the bucket 11. The bottle 13 rotates about the rod 14 when a rodent attempts to climb onto or walk on the bottle 13. The rotation of the bottle 13 also prevents a trapped rodent from climbing back onto the bottle 13 to escape the trap 10. The holes 17 in the bottle 13 may vary in size relative to each other in order to enable the bottle 13 to rotate unevenly, thereby providing a particularly unstable support for a rodent that positions itself on the bottle 13. In a preferred embodiment, a cap (not shown) on the bottle 13 is removed so that the mouth of the bottle 13 defines one of the holes 17 through which the rod 14 extends.

In order to attract rodents, the bottle 13 is treated with at least one rodent attractant as shown in FIGS. 1, 2, and 3. In a preferred embodiment, the bottle 13 is treated with both an olfactory rodent attractant 15 and a visual rodent attractant 16; however, both are not necessarily required to achieve the goal of attracting rodents to the trap. In the preferred embodiment, the olfactory rodent attractant 15 on the bottle 13 is molasses; the visual rodent attractant 16 on the bottle 13 comprises distinctively-colored adhesive tape. For instance, if the bottle 13 is made of translucent plastic, strips of black adhesive tape may serve as an effective visual rodent attractant.

After the invention is assembled as described above and the bucket 11 is filled approximately half full with the water and molasses mixture, the invention functions as follows. A rodent is attracted to the trap by the rodent attractant 15 and/or 16 applied to the bottle 13. The rodent then attempts to climb onto the bottle 13 in order to draw closer to the attractant(s). The substantially cylindrical shape of the bottle 13, the capacity of the bottle 13 to rotate about the rod 14, and the weight of the rodent cause the bottle 13 to rotate about the rod 14, which in turn causes the rodent to lose its balance. The rodent then falls into the water 12 (FIG. 3) in the bucket 11, ultimately drowning in the water 12. The water 12 also masks the scent caused by the decomposing rodent.

In a preferred embodiment of the invention, the bucket 11 is a three-gallon plastic bucket standing 12" high, the bottle 13 is 7" long, and the rod 14 is 12½" long and is secured to the bucket 11 at a point 1" below the opening 18 of the bucket 11.

A reusable, odorless rodent trap is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An apparatus for trapping and killing rodents, said apparatus comprising:

(a) a container having an opening, said container oriented such that said opening faces upward, thereby enabling retention of rodents in said container;

(b) a substantially cylindrical member rotatably mounted across said opening of said container, said cylindrical member comprising a plastic bottle adapted for providing unstable support for rodents, thereby causing rodents positioning themselves on the cylindrical member to fall into said container, (c) a portion of said cylindrical member being treated with at least one rodent attractant to attract rodents to position themselves on said cylindrical member; and (d) said container containing a substance for killing rodents and masking the scent caused by the decomposition of rodents.

2. An apparatus according to claim 1, said cylindrical member having at least two holes for carrying a rigid rod for rotatably mounting said cylindrical member on said container.

3. An apparatus according to claim 2, wherein said holes vary in size such that said cylindrical member rotates unevenly about said rod, thereby causing rodents positioning themselves on said cylindrical member to fall into said container.

4. An apparatus for trapping and killing rodents, said apparatus comprising:
 (a) a container having an opening, said container oriented such that said opening faces upward, thereby enabling retention of rodents in said container;
 (b) a substantially cylindrical member rotatably mounted across said opening, said cylindrical member having at least two holes defined therein for carrying a rigid rod for rotatably mounting said cylindrical member on said container, wherein said holes vary in size such that the cylindrical member rotates unevenly about said rod for providing unstable support for rodents, thereby causing rodents positioning themselves on the cylindrical member to fall into the container;
 (c) a portion of the cylindrical member being treated with at least one rodent attractant to attract rodents to position themselves on the cylindrical member; and
 (d) the container containing a substance for killing rodents and masking the scent caused by the decomposition of rodents.

5. An apparatus for trapping and killing rodents, said apparatus comprising:
 (a) a container having an opening, said container oriented such that said opening faces upward, thereby enabling retention of rodents in said container;
 (b) a substantially cylindrical member rotatably mounted across said opening of said container, said cylindrical member providing unstable support for rodents, thereby causing rodents positioning themselves on the cylindrical member to fall into said container;
 (c) a portion of said cylindrical member being covered with a removably-attached visual rodent attractant for attracting rodents to position themselves on said cylindrical member, said attractant comprising distinctively-colored adhesive tape; and
 (d) said container containing a substance for killing rodents and masking the scent caused by the decomposition of rodents.

6. An apparatus according to claims 4 or 5, wherein said rodent attractant is a visual rodent attractant removably attached to a portion of said cylindrical member.

7. An apparatus according to claim 6, wherein said visual rodent attractant comprises distinctively-colored adhesive tape.

8. An apparatus according to claims 4 or 5, wherein said rodent attractant is an olfactory rodent attractant applied to a portion of said cylindrical member.

9. An apparatus according to claims 4 or 5, wherein said rodent attractant comprises both a visual rodent attractant and an olfactory rodent attractant.

10. An apparatus according to claim 9, wherein said visual rodent attractant comprises distinctively-colored adhesive tape and said olfactory rodent attractant comprises molasses.

11. An apparatus according to claims 4 or 5, wherein the rodent is killed by drowning in said substance.

12. An apparatus for trapping and killing small rodents such as mice and rats, said apparatus comprising:
 (a) a container having an opening, said container oriented such that said opening faces upward, thereby enabling retention of rodents in said container;
 (b) a bottle rotatably mounted across said opening of said container;
 (c) said bottle having at least two holes for carrying a rigid rod for rotatably mounting said bottle on said container, said holes varying in size such that said bottle rotates unevenly about said rod, thereby causing rodents positioning themselves on said bottle to fall into said container;
 (d) a portion of said bottle being removably coated with molasses to attract rodents to position themselves on said bottle;
 (e) distinctively-colored adhesive tape being removably attached to said bottle to attract rodents to position themselves on said bottle; and
 (f) said container containing a mixture of water and molasses for drowning rodents and masking the scent caused by the decomposition of rodents.

* * * * *